April 17, 1928.  1,666,728

W. BIEDERMAN

PROJECTING SPRING TRAP FOR TRAPPING FUR BEARING ANIMALS

Filed June 27, 1927

INVENTOR
William Biederman
BY
E.J. Fetherstonhaugh

Patented Apr. 17, 1928.

1,666,728

UNITED STATES PATENT OFFICE.

WILLIAM BIEDERMAN, OF SESEKINIKA, ONTARIO, CANADA.

PROJECTING SPRING TRAP FOR TRAPPING FUR-BEARING ANIMALS.

Application filed June 27, 1927, Serial No. 201,821, and in Canada May 17, 1926.

This invention relates to an animal trap as described in the present specification and illustrated in the accompanying drawings which form part of the same.

The invention consists essentially of the novel features pointed out broadly and specifically in the claims for novelty following a description containing an explanation in detail of an acceptable form of the invention.

The objects of the invention are to provide a very efficient trap of simple construction; to build a trap which is operated or sprung when the animal seizes the bait in its mouth and attempts to carry it away or otherwise pulls it away from the trap proper; to so construct the device that the animal is caught by the neck, and to provide means whereby the trap, the moment it is sprung, has a tendency to jump upwardly and therefore better insure the trapping of the animal; to design the trap so that it will, in most cases, lie flat upon the ground and is not disturbed or sprung when stepped upon by the animal; and generally, to furnish a greatly improved animal trap having many safety means and being of strong and light construction.

In the drawings, Figure 1 is an end elevation view of the device showing the jaws in their closed position;

Like numerals of reference indicate corresponding parts in the various figures.

Figure 1:
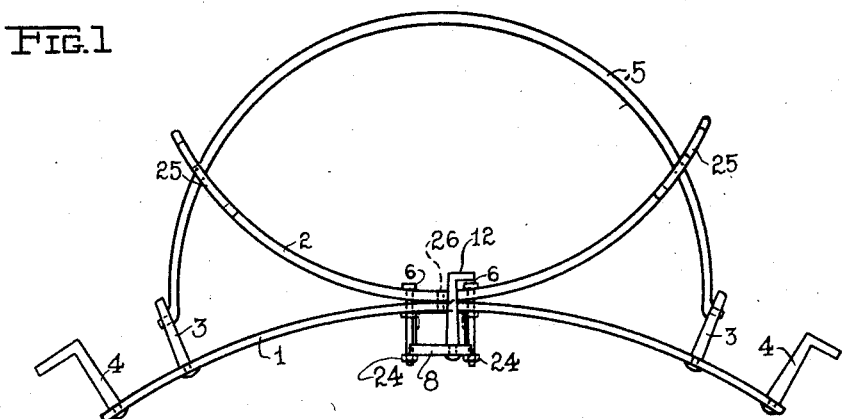

Referring to the drawings, 1 is a curved spring, and 2 is a second curved spring secured to the spring 1 by means of the bolts 6 having suitable nuts, which bolts extend some distance below the lower face of said spring. The springs 1 and 2 are so assembled that a line drawn parallel with the bolts 6 at a point midway therebetween would bisect each of said springs into two equal halves.

5 are a pair of curved metal bars pivotally mounted on the brackets 3 which are secured to the spring 1, and forming the two co-acting jaws of the trap. A slot 25 is provided adjacent each end of the spring 2 slidably engaging the two jaws 5, as is best shown in Figure 2. It will thus be seen that as the springs are allowed to assume their normal shape or form, that is, that shown in Figure 1, the jaws 5 will be swung inwardly or towards one another.

4 are a pair of safety locks pivotally carried adjacent the ends of the spring 1 whereby the springs 1 and 2 can be locked in their stretched or operative position preparatory to setting the jaws 5 in their open or operative position.

Figure 2:
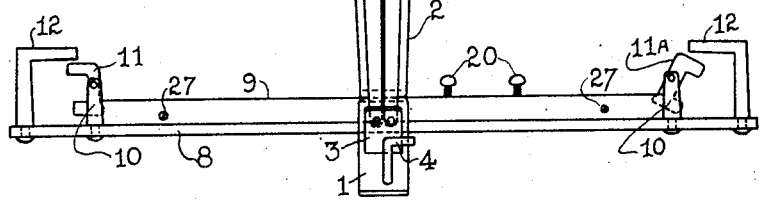
Figure 2 is a side elevation view of Figure 1.

8 is a flat bar upon which is secured a casing 9—to be referred to later—the bar and casing being secured at right angles to the spring 1 between the bolts 6 by means of the nuts 24 threaded upon the ends of said bolts, as best shown in Figure 1. 12 are safety locks pivotally carried adjacent the ends of the bar 8 whereby the jaws 5 can be locked in their open or operative positions preparatory to setting the trap operating mechanism into operative position.

11 and 11$^A$ are a pair of catches pivotally mounted in the brackets 10 secured to the bar 8 and formed substantially as shown. The catches are positioned to engage, when in an approximate vertical position, the jaws 5 and releasably lock same in their operative position. When the catches therefore, are turned inwardly so as to release the jaws, the resiliency imparted to the springs 1 and 2 by their being bent down from their normal position, will cause said springs to assume their normal form or shape and cause the jaws to be swung inwardly.

Figure 3:
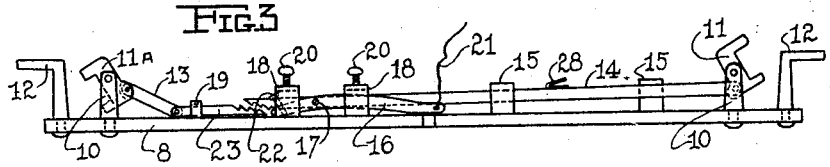
Figure 3 is a side elevation view of the operating mechanism.
Figure 4:
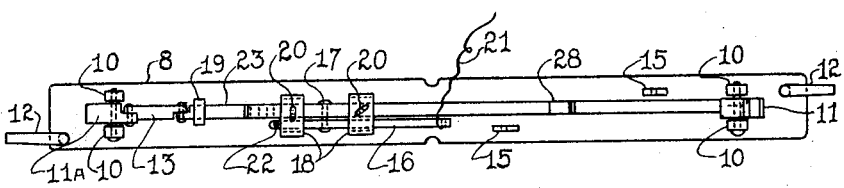
Figure 4 is a plan view of Figure 3.

23 is a bar or rod resting upon the top face of the bar 8 and sliding in the slide bearing 19, and having a plurality of teeth in its upper edge; 13 is a link pivotally connected at one end to the lower end of the catch 11$^A$ and pivotally connected at the other end to the bar 23. 14 is a bar or rod pivotally connected at one end to the lower part of the catch 11$^A$ and having at the other end a plurality of teeth formed to engage or co-act with the teeth in the rod 23. The teeth are made substantially as shown in Figure 3, so that when the rods 14 and 23 are actuated towards one another, their co-acting teeth will slip one upon the other, whereas when the said rods are pulled away from one another, their co-acting teeth will engage and releasably lock one to the other.

16 is a trip or trigger, pivotally connected at 17 to the bar 14, and bearing at one end upon the bar 8; 21 is a string tied to the other end of the trigger and passed through the hole 26 in springs 1 and 2. A bait is suitably fastened to the exposed end of said string. A screw 22 is provided at one end of the trigger whereby its action can be hastened or retarded.

9 is a casing or cover detachably secured upon the top of the bar 8 by means of screws 27 engaging the brackets 15, whereby the operating mechanism can be protected from rain or snow. In order to better retain the bar 14 is co-operative engagement with the bar 23, a spring 28 is provided as shown, sized to bear upon the inner face of the top of said cover 9.

20 are screws positioned to engage the bar 14 and trigger 16 and therefore provide additional means of safely locking the device against operation.

Operation: The device is deposited upon the ground and pressure applied downwardly upon the ends of the spring 2 until they are in a position to be engaged by the safety locks 4. The jaws 5 are open until the locks 12 can be operated to lock said jaws. The catches 11 and 11^A are swung out to engage the jaws and the screws 20 actuated to lock the operating mechanism. The trap is baited and then carried to the desired position. The device is then deposited upon the ground, the screws 20 released, then the locks 12, and finally the locks 4, the trap now being ready for operation.

It will be seen that the cross-member 8 retains the trap with the springs 1 and 2 in substantially a vertical plane.

It is to be understood that the trap would be still very effective even if the member 1 were replaced by a non-resilient member.

What I claim is:

1. An animal trap comprising a pair of spring-operated jaws, a spring member mounting said jaws, a cross member secured to said spring member, catches carried by said cross-member and positioned to operatively engage said jaws when open, rods pivotally connected to said catches and having co-acting teeth adapted to lock said rods against relative displacement in one direction only, and a bait-operated trigger for unlocking said rods.

2. An animal trap comprising a pair of spring-operated jaws, a spring member mounting said jaws, a cross member secured to said spring member, catches carried by said cross-member and positioned to operatively engage said jaws when open, rods pivotally connected to said catches and having co-acting teeth adapted to lock said rods against relative displacement in one direction only, a cover over said cross member adapted to shield said rods, a spring carried by one of said rods engaging said cover and adapted to urge said rod downwardly and a bait-operated trigger for unlocking said rods.

3. An animal trap comprising a pair of spring-operated jaws, a spring member mounting said jaws, a cross member secured to said spring member, catches carried by said cross member and positioned to operatively engage said jaws when open, rods pivotally connected to said catches and having co-acting teeth adapted to lock said rods against relative displacement in one direction only, a bait-operated trigger for unlocking said rods, and a vertically adjustable screw carried by said trigger for hastening or retarding the action thereof.

Signed at the Township of Teck this 23rd day of June, 1927.

WILLIAM BIEDERMAN.